(12) United States Patent
Molinelli et al.

(10) Patent No.: US 8,751,335 B2
(45) Date of Patent: Jun. 10, 2014

(54) PERSONAL STYLE SERVER

(76) Inventors: Noel Rita Molinelli, Bronx, NY (US); Derek Gatts, Bronx, NY (US)

(*) Notice: Subject to any disclaimer, the term of this patent is extended or adjusted under 35 U.S.C. 154(b) by 631 days.

(21) Appl. No.: 12/578,992

(22) Filed: Oct. 14, 2009

(65) Prior Publication Data

US 2010/0094696 A1    Apr. 15, 2010

Related U.S. Application Data

(60) Provisional application No. 61/105,403, filed on Oct. 14, 2008.

(51) Int. Cl.
*G06Q 30/00* (2012.01)
*G06Q 30/02* (2012.01)

(52) U.S. Cl.
CPC ........ *G06Q 30/0214* (2013.01); *G06Q 30/0271* (2013.01)
USPC ...................................................... 705/27.2

(58) Field of Classification Search
CPC ................................................. G06Q 30/0643
USPC ........................................................ 705/27.2
See application file for complete search history.

(56) References Cited

U.S. PATENT DOCUMENTS

| | | | | |
|---|---|---|---|---|
| 7,418,407 | B2* | 8/2008 | Giannini | 705/26.8 |
| 7,627,502 | B2* | 12/2009 | Cheng et al. | 705/27.2 |
| 7,712,035 | B2* | 5/2010 | Giannini | 715/747 |
| 2002/0032723 | A1* | 3/2002 | Johnson et al. | 709/203 |
| 2007/0220540 | A1* | 9/2007 | Walker et al. | 725/14 |
| 2010/0030578 | A1* | 2/2010 | Siddique et al. | 705/3 |
| 2013/0066750 | A1* | 3/2013 | Siddique et al. | 705/27.2 |

FOREIGN PATENT DOCUMENTS

WO    WO 03069526 A1 *  8/2003

* cited by examiner

*Primary Examiner* — James W Myhre
(74) *Attorney, Agent, or Firm* — Evans & Molinelli PLLC; Eugene Molinelli

(57) ABSTRACT

Techniques for providing advice on personal style include receiving advice field data and a demonstration message. The advice field data indicates multiple fields to be filled by an advisor to provide information on how to improve personal style of an advisee based on an image provided by the advisee. The demonstration message includes first image data that indicates example personal style of a first user. An advice prompt message is sent to a different second user. The advice prompt message includes second image data based on the first image data, and the advice field data.

17 Claims, 10 Drawing Sheets

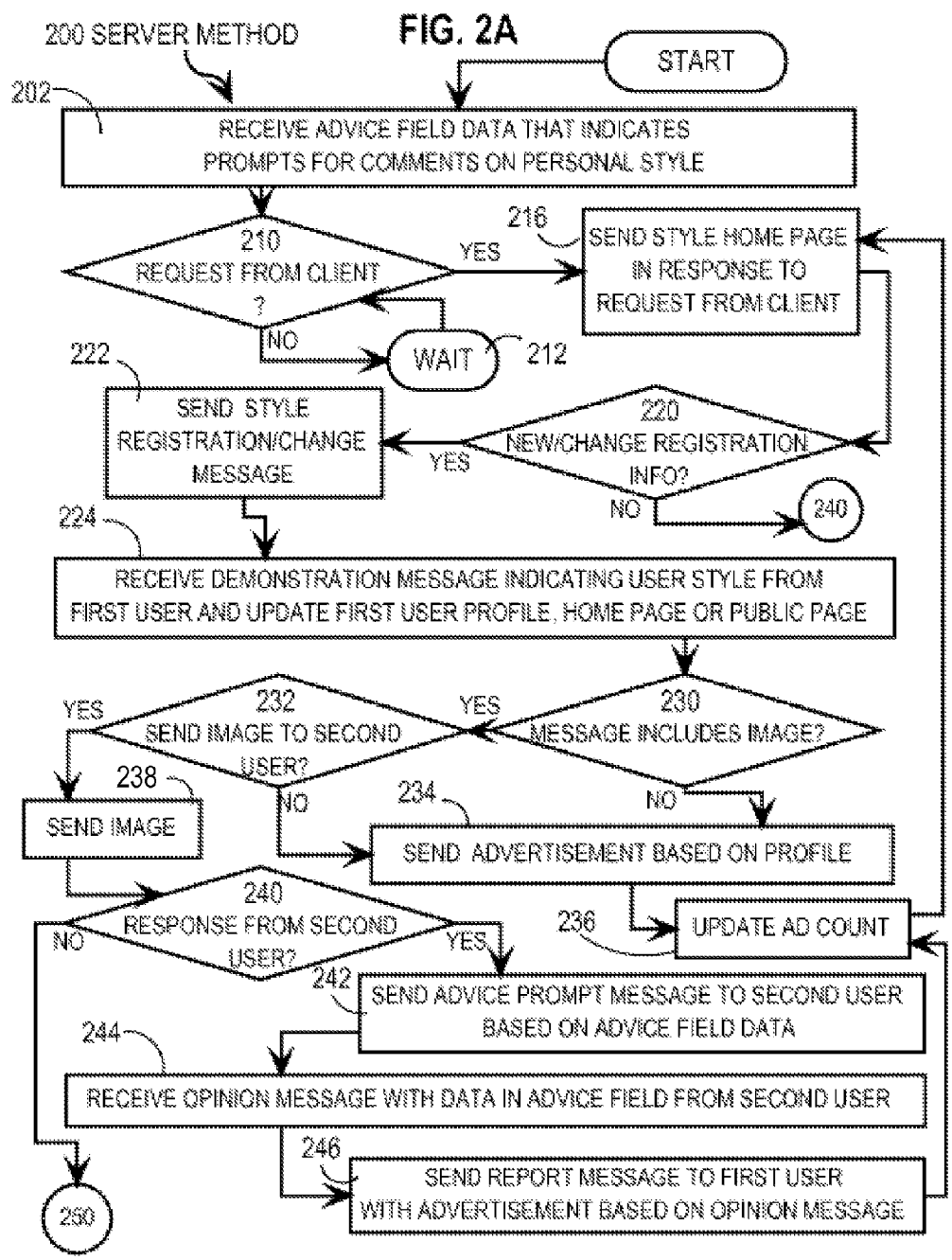

200 SERVER METHOD (CONTINUED)

PERSONAL STYLE SERVER

CROSS-REFERENCE TO RELATED APPLICATIONS

This application claims benefit of Provisional Appl. No. 61/105,403, filed Oct. 14, 2008, the entire contents of which are hereby incorporated by reference as if fully set forth herein, under 35 U.S.C. §119(e).

BACKGROUND OF THE INVENTION

1. Field of the Invention

The present invention relates to providing advice on personal style, such as using a personal style server on a communications network.

2. Description of the Related Art

Communication networks, such as Internet, are well known and widely used in commerce. Information is exchanged between two communicating nodes on the network. One model for the exchange of information is the client-server model, also well known in commerce.

According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, but not limited to those reasons.

Various servers for social networking are known, including servers to display personal facts (e.g., Facebook), writings (e.g., blogs) and video clips (e.g., Youtube), among others. However, there are other opportunities for social networking that have not yet been developed.

SUMMARY OF THE INVENTION

Techniques are provided for advice on personal style that is not provided by prior art social networking.

According to one set of embodiments, a method includes receiving advice field data and a demonstration message. The advice field data indicates multiple fields to be filled by an advisor to provide information on how to improve personal style of an advisee based on an image provided by the advisee. The demonstration message includes first image data that indicates example personal style of a first user. An advice prompt message is sent to a different second user. The advice prompt message includes second image data based on the first image data, and the advice field data.

In some embodiments of this set, the method includes receiving from the second user an opinion message that includes a value for at least one field indicated by the advice field data.

In some embodiments of this set, the method includes sending to the first user a report message that includes a value for at least one field indicated by the advice field data based on the opinion message.

In some embodiments of this set, the method includes sending to the first user an advertisement message that indicates a product from a vendor, wherein the product indicated is based on the demonstration message.

In other sets of embodiments an apparatus or computer readable medium is configured to perform one or more steps of the above methods.

An advantage of some embodiments is that users, equipped only with a Web browser, can register to receive or give advice on personal style, anonymously or with attribution, for any of one or more style types based on an example of style depicted in an image provided by a user. Thus, such users can rapidly and graciously improve their personal style. Further advantage in some embodiments includes vendors being encouraged that their advertisements are being received by interested and motivated users much more likely than average to make a purchase.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 2A and FIG. 2B depict a flow diagram that illustrates at a high level a method for providing advice on personal style, according to an embodiment;

DETAILED DESCRIPTION

Techniques are described for providing advice on personal style. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are described below in the context of a World Wide Web browser communicating over the public Internet with a web server that is configured to provide web pages based on providing advice on personal style and files are stored at one or both of the browser host and server host. However, the invention is not limited to this context. In other embodiments a specialized style client executes on a host accessed by a user while a style server executes on one or more of the same or different hosts communicating with or without a network, such as the Internet or a private enterprise network, while storing files on the same or different hosts, or other mechanisms are used to solicit and deliver the advice.

1. Overview

According to various embodiments, both style advisors and advisees are users of a style service provided, for example, by a style server. Advice prompt fields are defined at the server and presented to an advisor, along with an image depicting the style of an advisee, in order to elicit precise statements from the advisor of suggested changes to the style of the advisee. The advisee is then presented with one or more comments or suggestions or both from one or more advisors regarding the advisee's personal style. A particular user may be an advisor for some other users and an advisee of still other users.

Figure 1:
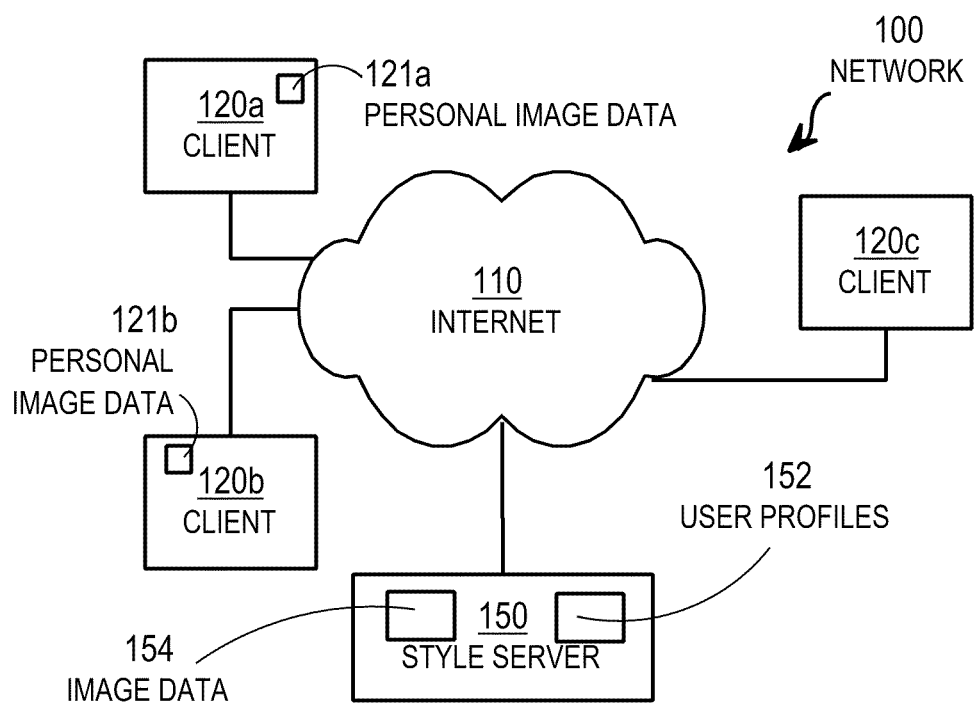
FIG. 1 is a block diagram that illustrates an example network, according to an embodiment.

According to an illustrated embodiment, the system is implemented on a network as depicted in FIG. 1. FIG. 1 is a block diagram that illustrates an example network 100, according to an embodiment. The network 100 includes the Internet 100 that is configured to switch data packets among end nodes using the Internet Protocol (IP) and any of a variety of application level protocols, including the hypertext transfer protocol (HTTP) used to send World Wide Web pages between a World Wide Web client (called a Web browser, or, simply, a browser) and a World Wide Web server. Connected to the Internet 110 are several processes operating on hosts (not shown), including style clients 120a, 120b, 120c (collectively referenced hereinafter as style clients 120) and style server 150. In some embodiments, the clients 120 are Web browsers and the style sever 150 communicates with the clients 120 by sending HTTP data packets.

According to the illustrated embodiments, the clients 120a, 120b, 120c store personal image data 121a, 121b, 121c, respectively (collectively referenced hereinafter as personal image data 121). The style server 150 stores user profiles data 152 and image data 154.

The personal image data 121 indicates the personal style of users of the respective clients 120. For example, the image depicts a photo of a room in their home, the user wearing clothes, or hairstyle or facial makeup, or engaging in some activity, such as for fitness. Preferably, the image is an actual photograph owned by the user, or portion thereof, and not the output of some computer-aided design (CAD) system. When a user, such as an advisee, accesses the server, a home page for that advisee is sent by the server. The style server 150 uses messages solicited and received from clients 120 to form and store user profiles 152 and image data 154. In the illustrated embodiment, the messages are solicited by means of web forms and active page components implemented by scripts or applets or other well-known means, which are sent to clients 120 and presented by clients 120 to users; or by emails; or other forms of communication. In other embodiments, input for the messages is solicited directly by the client process. The style server then solicits advice from some users, called advisors. The selection of advisors from whom to solicit advice is described in more detail below. The form of the prompts used to solicit the advice is designed to elicit precise responses so that concrete advice is obtained, which, for example, can be compared among different advisors. The responses received from the clients of advisors are stored at style server 150 in the user profiles of the advisees and sent to clients 120 of advisees, such as by updating the home page of the advisee presented when the advisee accesses the style server 150 or in one or more email messages or other communication means, or some combination.

In some embodiments, the advisees can contact or rate the advisors, or both.

In some embodiments, a particular user forms a public page shared among some or all other users who are style partners for the particular user.

2. Example Embodiment

Figure 2B:
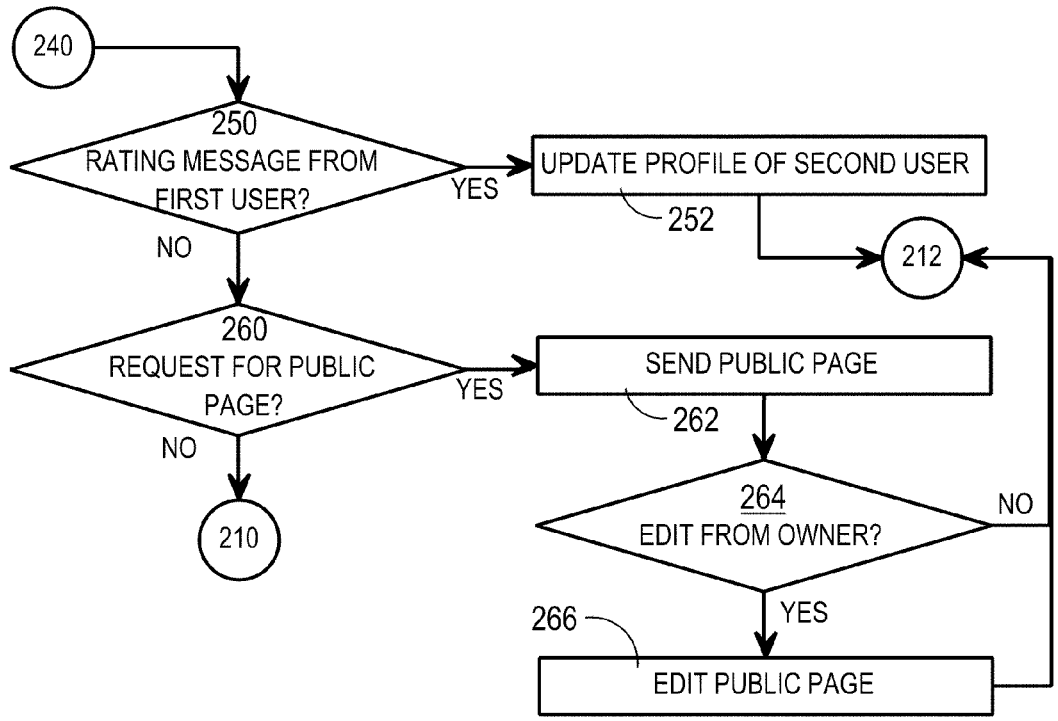

FIG. 2A and FIG. 2B depict a flow diagram that illustrates at a high level a method 200 for providing advice on personal style, according to an embodiment using a Web browser and a style server. In other embodiments, other communication means are used in addition to or instead of HTTP messages between a Web browser and the style server.

Although steps in method 200 are show in a particular order for purposes of illustration, in other embodiments, one or more steps may be performed in a different order or overlapping in time, in series or in parallel, or one or more steps may be omitted or added, or changed in some combination of ways.

In step 202, advice field data is received that indicates prompts for advice on personal style. Any method may be used to receive this data. For example, in various embodiments, the data is included as a default value in software instructions, is received as manual input from a style administrator on the local or a remote node, is retrieved from a local file or database, or is sent from a different node on the network, either in response to a query or unsolicited, or the data is received using some combination of these methods. Note that the advice field data does not hold values for these fields, but merely defines the fields. The values for the fields are provided by the users who are advisors, as described in more detail below. The advice data fields provide a structure for soliciting and exchanging style advice.

In an illustrated embodiment, advice field data includes one or more fields used to hold data that indicates an element of an image, such as a pixel location, a polygon of pixel locations enclosing an area, a pixel value range indicative of a particular range of colors, or a word or words describing an element depicted such as "dress," "couch" etc. In the illustrated embodiment, the advice field includes one or more fields used to hold data that indicates changes to the element indicated, such as a color change, a texture change, a pattern change, a position change, and a replacement item to replace the indicated element. In the illustrated embodiment, the advice field data includes one or more vendor fields used to hold data that indicates a vendor from which a consumer may purchase the color, texture, pattern, or replacement item. For example, the advice field data is listed in Table 1.

TABLE 1

Example advice fields for a style server.

| Field name | type | Intended contents |
|---|---|---|
| change element | list | center pixel location, or list of vertices of polygon, or range of pixel color values, or text describing depicted item or items |
| color vendor | text | Name or number identifying a particular vendor of a color (e.g., wall paint vendor, lipstick vendor, fabric vendor etc) |
| color | text | Name or number identifying a color available from the immediately preceding vendor |
| texture vendor | text | Name or number identifying a particular vendor of a texture (e.g., floor covering vendor, fabric vendor etc) |
| texture | text | Name or number identifying a texture available from the immediately preceding vendor |
| pattern vendor | text | Name or number identifying a particular vendor of a pattern (e.g., wallpaper vendor, fabric vendor etc) |
| pattern | text | Name or number identifying a pattern available from the immediately preceding vendor |
| replacement vendor | text | Name or number identifying a particular vendor of a replacement item (e.g., clothes vendor, furniture vendor) |
| replacement item | text | Name or number identifying a item available from the immediately preceding vendor |
| Re-arranged location | list | center pixel location, or list of vertices of polygon, or range of pixel color values, or text describing new location for the change element identified in the first line |
| Advice image | pointer | storage address of image that depicts one or more changes |
| invite contact | bit | 1 = yes, invite advisee to contact advisor; 0 = no |
| comment | text | Free text comments from advisor to advisee |

In step 210 it is determined whether a request is received at the server from a client. For example, it is determined in step 210 whether a request for a Web page is received from a browser. If not, control passes to step 212 to wait for a request from a client and back to step 210 to determine whether such a request is received.

If it is determined in step 210 that a request is received from a client 120, then control passes to step 216. In response to the request from a client, a home page for a particular user is sent to the client. In some embodiments, step 216 includes sending a Web form to the requesting Web browser for a user to login using a user identifier (user ID) and a password, to prevent others from posing as a particular user, or to register as a new user. The contents of the home page for a user depends on what information has been provided to the server by the user and either advisors or advisees of the user, or some combination, as will be described in more detail below. In general, the home page for a user includes the user ID, reduced depictions (called thumbnail images or, simply, thumbnails) of one or more images provided by the user or advisors or advisees, advertisements suitable for the user's style to help pay for the service, and active page components. Active Web page components, such as buttons, icons and pull-down menus are well known in the art. The active page components on the user's home style page allow the user to change information about the user or presented page components or give or respond to advice given.

In step 220, it is determined whether a user wishes to register or change registration data. Any method may be used to determine this. In the illustrated embodiment, this is determined by determining whether the user responded to the home page by activating one of the active page components associated with a new registration or a change to registration data. If not, control passes to step 240, described below, to determine what other action is indicated by the user's response to the home page.

If it is determined, in step 220, that the user wishes to register or change registration data, then control passes to step 222. In step 222, a style registration/change message is sent. For example, one or more HTTP messages are sent that build a style registration page. Some or all components in the style registration page may be stored locally by the client, as is well known in the art, to reduce the amount of new material that must be sent over the network in new HTTP messages.

Figure 3:
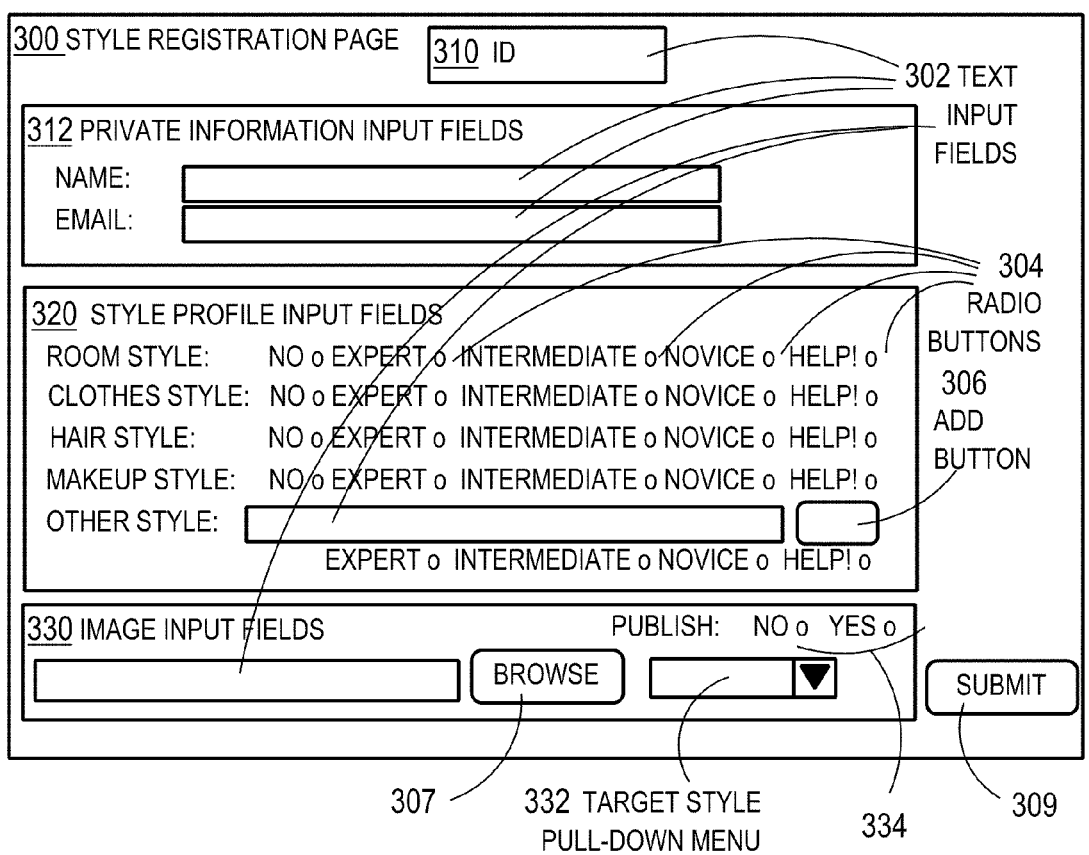
FIG. 3 is block diagram that illustrates a style registration page sent by a style server, according to an embodiment.

FIG. 3 is block diagram that illustrates a style registration page 300 sent by a style server, according to an embodiment. In FIG. 3 and subsequent figures depicting Web pages, the page is displayed on the user's client based on messages received from the style server. For example a Web page is displayed in a user's Web browser based on HTTP messages sent from the server, as is well known in the art. The page is sent in the sense that the style server sent commands to build the page; but as stated above, one or more components displayed may be stored locally on a client. Also, page components are displayed in FIG. 3, and other figures depicting Web pages, as contiguous areas of a display screen of a particular size in a particular spatial arrangement for purposes of illustration. However, in other embodiments one or more page components, or portions thereof, may be displayed in a different order or size or arrangement or in overlapping windows, or one or more components, or portions, may be omitted, or one or more other page components may be added.

The style registration page 300 includes a Web form, well known in the art, with text input fields 302, radio buttons 302 and other buttons, including an add button 306, a browse button 307 and a submit button 309. The page 300 is divided into a private information input fields portion 312, a style profile input fields portion 320, and image input fields portion 330. For a new registration all the text input fields 302 accept input, but for a previously registered user, the user ID field 310 and one or more text fields in private information input fields portion 312 representing information that should not be changed are deactivated.

The user ID field 310 is used to accept a suggested user ID during new registration. In some embodiments, the server checks the value in this box and blanks it out if the new user selects an ID already in use. In some embodiments, the server automatically appends one or more characters to the user's input to field 310 in order to make the user ID unique. For a previously registered user, the user ID field 310 is deactivated so as not to accept further user input.

The private information input fields portion 312 holds one or more text input fields or other active page components to allow the user to input or change personal information that is not shared with other users of the style service. In the illustrated embodiment, the private information includes the user's actual name and email address. Other private information presented for user input in some embodiments includes, birth year or birth date, gender, cultural background, or region (e.g., country and postal code), alone or in some combination, using text fields, calendars, pull down menus and other active page components.

The style profile input fields portion 320 holds one or more text input fields or other active page components to allow the user to input or change style information that is shared with other users of the style service. In the illustrated embodiment, the style profile input fields portion 320 includes radio buttons to indicate the style of interest to the user and the role the user will play among multiple roles. In the illustrated embodiment, several predefined styles types are available among which a user may choose, including room style, clothes style, hair style, makeup style. These are indicated by labels next to a series of radio button, described below. In some embodiments, the service is limited to a single type of style. In yet other embodiments more or fewer predefined style types are included.

In the illustrated embodiment a text input field 302 is included to allow a user to specify a style type that is not listed. For example, a user may be interested in getting or giving advice in fitness style or music style or automobile customizing style, which are not among the predefined styles in the illustrated embodiment. The user simply types the type of style in the text input field 301 in the style profile portion 320 of the page 300. When the user is sure the new style is properly typed, the user presses the add button 306 to add the new style to the user's home page. Of course, the user will find no advisees or advisors for this style type unless and until another user is interested enough to type in a similar style type.

For each style type label there are multiple radio buttons. A radio button labeled "NO" is selected to indicate a style type for which the user has no interest. For a new user, all the NO buttons are selected, and the user affirmatively selects a different button associated with each of the one or more styles for which the user has interest. The different buttons indicates a role the user wishes to play in the associated style type. At least two roles are included, e.g., an "Expert" role and a "Novice" role. In the illustrated embodiment, two additional roles are included: an "Intermediate" role for those more experienced than a Novice but not comfortable calling themselves an Expert; and a "Help!" role for a user who doesn't know anything or needs advice quickly. Selecting one of the radio buttons associated with a style unselects any other radio button associated with that same style, so a user can assume only one role per style type. However, the roles can be different for different style types. Thus a particular user can be an Expert in Clothes style but a Novice in Room style.

In an illustrated embodiment, an Expert role will be asked to give advice but will not get any; while a Novice or Help! Role will get advice but will not be solicited to give any. An Intermediate role will be allowed to both give and get advice. In some embodiments, all roles are able to both give and get advice.

The image input fields portion 330 holds one or more text input fields or other active page components to allow the user to add an image that depicts an example of the user's style. In the illustrated embodiment, the image input fields portion 330 includes a text input field 302 that allows the user to specify a file, such as by a directory name and file name on the client's host machine that contains the image to be used or a Universal Resource Locator (URL) address indicating a file location on a network. Any well known image format may be used by the selected file, such as a Joint Photographic Experts Group (JPEG) format file, a Tagged Image File Format (TIFF) file, etc. In the illustrated embodiment, the image input fields 330 includes a browse button 307, well known in the art, which will cause the user's file directory to be displayed so that the user merely selects a file listed in the directory. In some embodiments, the image file selected is associated with a particular style type, e.g., by highlighting a style type when entering the file. In some embodiments, the image file selected is also associated with a role for the style type, as indicated by the highlighted type. In some embodiments, the page is configured to prompt the user to associate the image file with a style type, or role, or both, or to provide the user the option to add additional image files, or both. However to avoid encumbering FIG. 3, these additional prompts are not shown. In some embodiments an image is not required and the user may activate the submit button without indicating any images.

In the illustrated embodiment, the image input fields 330 includes radio buttons 334 to indicate whether the image is to be published to the user's public page, that is shared among all style partners of the user. User style partners are described in more detail below, but in general refer to other users of the style server who have made connection with the user, as is well known in other social networking systems (e.g., Facebook). If the "NO" radio button is selected, the image indicated will not be included in the user's public page. If the "YES" radio button is selected, the image indicated will be included in the user's public page.

In the illustrated embodiment, the image input fields 330 includes a target style pull down menu. By default, no target style is associated with an image. However, the pull down menu allows the user to select the kind of look the user is shooting for, the target style. The suitable options displayed in the pull down menu depend on the style type. For example, target styles for Room style type include French provincial, US colonial, gothic, art deco, modern, Southwest, eclectic, among others. Example, target styles for Clothes style type include classic, business, trendy, punk, avant garde, among others. The target indicated by an image provided by a novice user indicates the look the novice is trying to achieve, starting with the supplied image. The target indicated by an image provided by an expert or intermediate indicates that the supplied image is a good example of the target style according to that expert or intermediate user.

The submit button 309 is activated by the user when all the other fields are filled to the user's satisfaction. Upon activating the submit button, the data indicated on the registration page is sent to the server, including a copy of the image files selected. The image files are stored in a data structure for image data 154 and the other information is stored in a data structure for user profiles 152. In some embodiments, a copy of each image file selected is also moved to a data structure controlled by the client for personal image data 121.

Returning to FIG. 2A, in step 224, the server receives a demonstration message indicating user style from a first user and updates the first user profile and home page. For example, the style server receives one or more HTTP messages sent from the client as a result of the user activating the submit button 309 on the Web forms of the registration page 300. Zero or more images, as indicated by the user in portion 330, are also sent to the server, for example using the well known File Transfer Protocol (FTP), and received during step 224.

Figure 4:
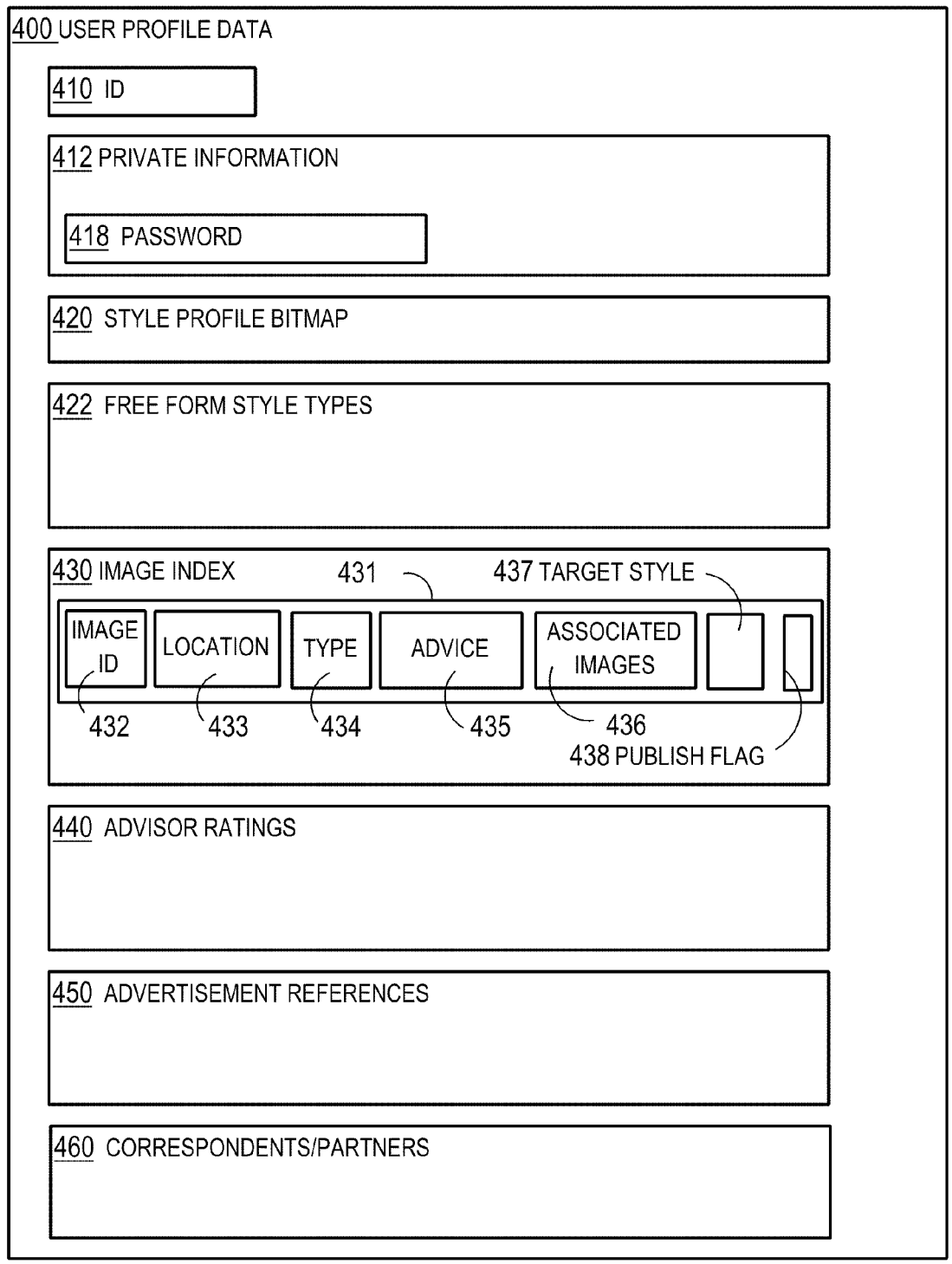
FIG. 4 is a block diagram that illustrates a user profile data structure stored by a style server, according to an embodiment.

FIG. 4 is a block diagram that illustrates a user profile data structure 400 stored by a style server, according to an embodiment. In the illustrated embodiment, user profile data structure 400 is stored during step 224. Various data fields are depicted as contiguous portions of a single computer storage area in FIG. 4, for purposes of illustration. However, in other embodiments one or more data fields, or portions thereof, may be stored in a different order on one or more storage devices, or one or more data fields, or portions thereof, may be omitted, or one or more other data fields may be included.

User profile data structure 400 includes a user ID field 410, private information fields 412, style profile bitmap 420, free-form style types fields 422, image index fields 430, advisor ratings fields 440, advertisement references fields 450, and correspondents/partners fields 460.

The user ID field 410 holds data that indicates the value for the unique user ID for the user who is the subject of data structure 400. The private information fields 412 hold data that indicates values received from the user for the information in private information input fields 312. In addition, fields for other private information generated by the service are included, if any. For example, in the illustrated embodiment, a password field 418 is included that holds data that indicates a value for the current password for the user to logon to the style server.

The style profile bitmap 420 holds data that indicates the styles of interest and the roles assumed for the user. Because the roles are all the same and the style types are predefined or listed separately, in some embodiments, the data is a bit map. In the bitmap a set of bits represents all the roles and style types. A bit is set to 1 if the associated role and style type has been selected by the user, and is set to 0 otherwise. For example, 20 bits represent the five roles (including NO interest) and four predefined style types depicted in portion 320 of the style registration page 300, in the left right then top down order shown. Only four of the bits are set to 1, one for each style type (each style type includes five bits). Thus a user who selected the Expert role for Makeup and the Intermediate role for Hair (and NO for the other style types) is indicated by the 20 bit string: 10000100000010001000.

The free-form style types field 422 holds data that indicates values for the "Other Styles" input by a user, a name for the style and a 5 bit bitmap for the role.

The image index 430 holds data that indicates values for each image associated with a user, whether originated by the user or based on an advisee image or an advisor image. In the illustrated embodiment, each image is described by an image record 431. Each image record includes an image ID field 432, an image location field 433, an image type field 434, an image advice field 435, an associated images field 436, a target style field 437, and a publish flag field 438. The image ID field holds data that indicates a unique value for the image, at least within the user profile data structure. In some embodiments, an image ID is generated that is unique among all images stored by the style server 150 in image data 154. The location field 433 holds data that indicates a value for a location of the image. Any method may be used to indicate the location where the image is stored and can be retrieved, e.g., a directory and file name, or a URL, or a network device and storage location, or an index into a database of images, stored locally or on another node of the network.

The image type field 434 holds data that indicates a value for the type of image. For example, in an illustrated embodiment the type of an image is indicated by data that indicates one or more style types associated with the image. In some embodiments, the image type also includes data that indicates whether the source of the image was the user, an advisor of the user, an advisee of the user, a vendor or an agent for a vendor.

The advice field 435 includes data that indicates values for one or more advice fields (e.g., the advice fields received in step 202 and listed in Table 1), for one or more style types, based on advice given by the user or an advisor of the user, as described in more detail below.

The associated images field holds a list of zero or more image IDs for images associated with the current image. For example, if it is assumed for purposes of illustration that the current image is an image produced by the user for which advice is received from an advisor, an associated image might be a different image produced by the advisor at the time the advice stored in field 435 was generated. For example, the associated image is an edited version of the user's image, as edited by the advisor, or an image of colors or patterns suggested by the advisor, as described in more detail below.

The target style field 437 holds data that indicates the target style associated with the image, if any, when the image was uploaded, as indicated in input field 332 depicted in FIG. 3. The publish flag field 438 holds data that indicates whether the user wants the image to appear on the user's public page. In some embodiments, the publish flag field 438 is a single bit that is equal to "0" if the image is not to be included on the user's public page, and is equal to "1" if it is to be included.

The advisor ratings fields 440 hold data that indicates values for ratings of the user generated by advisees who received advice from this user, as described in more detail below.

The advertisement references fields 450 hold data that indicates values for images or text provided by a vendor or agent for a vendor for advertisement purposes and associated with the current user by the style service. As described in more detail below, the advertisement is associated with the user based on the user's own profile or advice given to the user by an advisor.

The correspondents fields 460 hold data that indicates values for user IDs of other users who are corresponding with the user through the service. Such correspondents include advisors from whom the user has accepted invitations to contact, and advisees who the have accepted invitations to contact the user. The processes of extending and accepting invitations are described in more detail below.

Referring again to FIG. 2A, after step 224, control flows to step 230. In step 230, it is determined whether the demonstration messages include one or more images. If not, control passes to step 234.

In step 234, an advertisement is sent to the user based on the user profile. Any method may be used to send the advertisement, including telephone, regular mail and email. In an illustrated embodiment, the user's home page is updated with a reference to the advertisement, either statically, or dynamically while the user is logged on. The reference may be to content, such as a web page of the vendor, that is updated so that the advertisement can be time appropriate. The advertisement reference is based on the user profile data and included in the advertisement references fields 450, where the advertisement reference is added to or replaces advertisement references already stored there. Any method may be used to select the advertisement based on the user profile. In an illustrated embodiment an advertisement is selected among a group of subscribing advertisers based on the selected style types, the age, the culture or the geographic region of the user, or some combination. In step 236, an advertisement count (AD count) for the particular advertiser is updated to indicate that an advertisement was delivered to an interested user. In some embodiments, an advertising vendor makes a payment to an operator of the style service based on the AD count for that advertiser. Control then passes back to step 216 to send the updated home page to the user with the new advertisement. If the user is no longer online, then the user will receive the advertisement on the user's home page when the user next logs on.

If it is determined in step 230 that the demonstration messages include one or more images, control passes to step 232. In step 232, it is determined whether to send an image to a different second user. If not, control passes back to step 234 and 236 to send an advertisement based on the user's profile data, as described above.

Any method may be used to determine, in step 232, whether the image is sent to a different user. In an illustrated embodiment, it is determined whether there is any qualified user who has assumed an equal or more expert role in the style type or target style (or both) associated with the image. If so, then the image is sent to one or more of such qualified users. In some embodiments, the image is sent to a limited number of qualified users to prevent overburdening the network and individual users. In some of these embodiments, each image is sent to a few of the most qualified users based on geographic or cultural or age similarity to the user who provided the demonstration message that included the image. In some embodiments, a user is considered to be more or less qualified based on multiple ratings received from previous advisees of the user, as described in more detail below. In some embodiments, the image is sent to the most qualified users using a round robin procedure or other load balancing method.

If there is no qualified user for the particular style, then, in some embodiments it is determined that the image is not sent to a second user and control passes to step 234, described above. However, in some embodiments, if there are not qualified users, then the image is sent to an agent of the style service or a vendor as a second user.

If it is determined in step 232 to send the image to a second user, control passes to step 238 to send the image to the second user. The image may be sent to the second user in any manner, such as to a picture-enabled cell phone, an email or post. In an illustrated embodiment, the image is sent to a user by adding a thumbnail of the image to a home page of the second user. In some of these embodiments, the thumbnail is located on the home page in a group of thumbnails associated with advisees of the second user. Control then passes to step 240

In step 240, it is determined whether the second user is responding to an image on the second user's home page. For example, each thumbnail on the home page is associated with an active page component that sends the image ID to the server when the user selects the thumbnail. If not, control passes to step 250, described below with reference to FIG. 2B, to determine what other action is indicated by the user's response to the home page.

Figure 5:
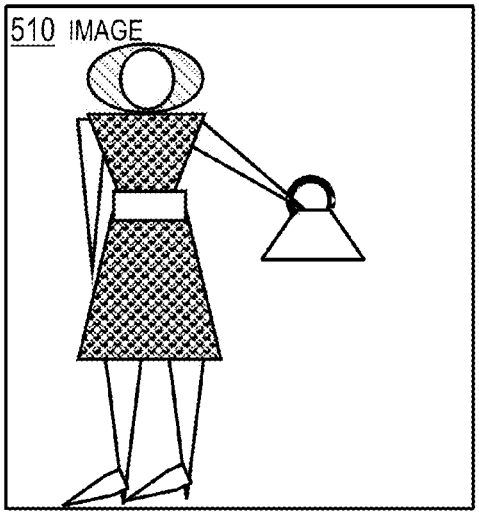
FIG. 5 is a block diagram that illustrates a style advice page sent by a style server, according to an embodiment.

If it is determined, in step 240, that the second user has responded to an image, control passes to step 242. In step 242, an advice prompt message is sent to the second user based on the advice field data. Any method may be used to send the advice prompt message. For example, one or more HTTP messages are sent that build a style advice page. Some or all components in the style advice page may be stored locally by the client, as is well known in the art, to reduce the amount of new material that must be sent over the network in new HTTP messages FIG. 5 is a block diagram that illustrates a style advice page 500 sent by a style server, according to an embodiment. The style advice page 500 includes a style type field 502, a target style field 504, an image 510, and multiple suggested change portions based at least in part on the advice field data. In the illustrated embodiment, the multiple suggested change portions include a suggested color change portion 520, a suggested texture change portion 530, a suggested pattern change portion, a suggested replacement portion 550, a suggested rearrange portion 560, a free text field 570, another change portion 590 and an invite contact portion 596.

The style type field 502 displays a value that indicates a style type associated with the image, so that the second user is aware of the type of style for which advice is sought. The target style field 504 displays a value that indicates the target style associated with the image, so that the second user is aware of the target style the advisee is aiming for. The image 510 displays an enlarged image that initially depicts the image from the advisee, which serves as an example style for which advice is sought. In some embodiments, the image 510 is modified based on suggested changes made by the second user and the image 510 displays either the edited image or both original and edited images, either side by side or in partially or fully overlapping windows between which the second user can alternate. For purposes of illustration, it is assumed that image 510 depicts a person wearing a blouse, skirt, belt, high-heeled shoes, a particular hair style and carrying a purse.

In the illustrated embodiment, the user ID of the advisee who provided the original image is not displayed to allow the advisee to obtain guidance anonymously and thus avoid future embarrassment. In some embodiments the user ID of the source of the image is displayed or not at the discretion of the advisee as indicated in a special field (not shown) of the user profile of the advisee.

The suggested color change portion 520 includes a label button 521, a spot button 522, an expand button 523, a vendor pull-down menu 524 and a color pull-down menu. The spot button 522 is activated by the second user to indicate an element of the image 510 to change.

Any method may be used to indicate the element of the image to change. In some embodiments, when the spot button is activated, the cursor indicating a screen position of a pointing device, such as a computer mouse, changes shape to indicate an active cursor. The second user then places the cursor at a location within the element to be changed and activates the pointing device, e.g., by a click of a button on the pointing device. The location of the pixel underlying the cursor when the pointing device is activated is then captured by the Web page. It is understood that methods to detect and capture pointing device activation on a web page, such as using scripts and applets sent to the client from the server, are varied and well known in the art and do not require further description here.

In some embodiments, the cursor retains the changed shape and the second user may repeatedly activate the pointing device to capture multiple pixel locations, until the spot button is activated again. The multiple pixel locations are used to define a polygon that encloses the element of the image to be changed.

In some embodiments, an expand button is included to indicate the element of the image to change. When the second user activates the expand button, new pixels are added to the pixels indicated by the first pixel location or inside the polygon until an edge or boundary is reached in the image 510. Any method known in the art of image processing to detect edges and boundaries may be used. In this manner, the second use may easily select all the pixels in, e.g., a wall or carpet by selecting one or more pixels on the wall or carpet and then activating the expand button. In some images, the lighting changes are such that the first activation of the expand button does not capture all the pixels of the element to change, and the expand button is activated repeatedly until the second user is satisfied that the element to be changed is clearly identified.

In some embodiments, a label button 521 is included in the suggested color change portion. When the label button 521 is activated by the second user an input text field is presented into which the user may type characters that label the item selected with one or more words. For example the second user may activate the label button and enter the word "purse" to indicate that the purse is indicated by the associated pixels. In some embodiments, the label button is activated without the spot button and serves as the only indication of the change element. For example, even without pixel locations, the label "purse" indicates the element of the image 510 to be changed.

The vendor pull-down menu 524 is activated by the advisor, e.g. the second user, to select a vendor that has the colors the advisor believes will improve the style of the advisee (e.g., the first user in the illustrated embodiment). In some embodiments, all vendors that publish colors available to the public are included for the style type indicated in field 502. In some embodiments, one or more vendors who contract with the style service operator to provide proprietary colors are included in the vendor list. The color pull-down menu 526 is activated by the advisor to select the color the advisor believes will improve the style of the advisee, from among all the colors available from that vendor. The selected color is indicated by vendor identifier for the color. In some embodiments, the color is also rendered next to the color identifier in the pull down menu or an associated image being generated by the advisor.

In some embodiments, the color is added to the image 510 to provide an edited image. The color may be added in any manner. For example, in some embodiments a square of the color is added to the image 510 and a line connects that square to one or more of the pixel locations selected. In some embodiments, all the pixels in the polygon or automatically detected edges are replaced with pixels of the selected color. In some embodiments shading and lighting changes originally inside the polygon or expanded area are added to the color for a more realistic rendering.

Similarly, the suggested texture change portion 530 includes a spot button 532, an expand button 533, a vendor pull-down menu 534 and a texture pull-down menu 536, with functions analogous to those described above for the suggested color change portion 520. In some embodiments a label button (not shown) is included. In some embodiments, a change element is assumed to be the same as identified most recently in another suggested change portion unless and until the advisor activates one of the spot or expand or label buttons.

Likewise, the suggested pattern change portion 540 includes a spot button 542, an expand button 543, a vendor pull-down menu 544 and a pattern pull-down menu 546, with functions analogous to those described above for the suggested color change portion 520. In some embodiments a label button (not shown) is included. The suggested replacement change portion 550 includes a spot button 552, an expand button 553, a vendor pull-down menu 554 and a replacement item pull-down menu 556, with functions analogous to those described above for the suggested color change portion 520. In some embodiments a label button (not shown) is included The suggested rearrange portion 560 includes a spot button 562 and an expand button 563 with functions analogous to those described above for the suggested color change portion 520, and a destination spot button 564. The destination spot button 564, with function analogous to the spot button 562, is used to indicate a new location of the center of the element to be changed. For example, in a room style, a second user may suggest moving the couch from the window to a spot opposite the fireplace in the room by using the destination spot button 564 to indicate the location opposite the fireplace in the image 510.

The free text field 570 allows the advisor to make any comments not covered by the above suggested changes. In a preferred embodiment, the free text field 570 is not activated unless and until the second user makes one of the more structured suggested changes represented by portions 520 through 560.

Invite contact partner portion 596 includes a pull down menu 598, with at least two choices: yes (invite the advisee to contact the second user, advisor); and no (do not invite contact). In some embodiments, other choices are included in the pull done menu. Such as, invite the advisee to become a style partner of the advisor. In this manner the advisor may provide advice without having to be further involved dealing with questions or comments from the advisee.

Another change portion 590 includes a pull-down menu 592 with at least three choices: yes (there is another change to suggest); no (there is not another change to suggest); and send (send the suggested changes to the server and close the style advice page). The second user activates the pull-down menu 592 to indicate the desired action.

Referring again to FIG. 2A, control passes from step 242 to step 244. In step 244, an opinion message is received from the second user with data that indicates a value for at least one advice field. In the illustrated embodiment, the opinion message is sent in one or more data packets from the client based on the responses entered at the Style Advice Page 500 as controlled by the script or applet executing in the client, using any method known in the art. Control then passes to step 246. In some embodiments, not shown, if a response is not received within a reasonable time, then control passes back to step 212 to await the next request from a client.

If the opinion message received includes one or more images from the advisor, then those images are given image IDs, stored in image data 154 at the server and entered into the image index of the image profile data structure for the advisor (e.g., the second user). In some embodiments, the script or applet executing on the client also stores the image locally on the second user's client as personal image data 121, so that the image can be displayed on future pages for the second user without having to consume network bandwidth sending the entire image file.

In step 246, a report message is sent to the first user with advertisement based on the opinion message. Any method may be used to send the report, including mail, telephone and email. In an illustrated embodiment, the report is sent by updating the first user's home page and returning control to step 216. In some embodiments in which the home page is updated dynamically from the user profile, the home page is updated by updating the user profile data 152 for the first user at the server. For example, the values for the advice data fields received from the second user are stored in the user profile data structure 400 for the first user, in the image index 430 advice field 435 of the image record 431 for the image sent by the first user. Advertisement references are added to the advertisement references fields 450 for vendors included in the advice field 435.

If an edited image or other image is provided by the second user, serving as advisor, then the reference to the edited or other image is added to the user profile of the first user, as a new image record 431 in which the type field 434 holds data that indicates the source is an advisor. Examples of other images are those depicting color, texture, pattern or replacement items from a vendor, alone or in some combination, as suggested by the adviser. The image ID of the edited or other image is also added to the associated images list 436 of the image record for the original image sent by the first user. Thus when the first user refers to the original image, the server can detect that the edited or other image is related; and should be so indicated or displayed on the home page of the first user.

Advertisement references, such as links to the vendors web pages, or stored photos/text provided by the vendors as advertisements, are added to the field 450 based on the opinion message. The added references include advertisement references for the vendors selected in any, several, or all of the vendor pull-down menus operated by the second user on the Style Advice Page and sent in the opinion message. In various embodiments, these advertisements are added to or replace references already in the advertisement references field 450.

Control then passes to step 236 to update the AD count and then to step 216 to send the updated home page to the first user. If the first user is no longer online, the home page is not sent until the user next logs on to the style server. In some embodiments, if the user is not online when the home page is updated in step 246, an out-of-band alert is sent to the first user indicating that an advisor has responded. For example a telephone call, text message or email is sent to the first user. This alert may prompt the first user to log on to the style server, receive the updated home page and observe the advice received.

If it is determined, in step 240, that the response to the home page is not an opinion message response from the second user, control passes to step 250 in FIG. 2B. In step 250, it is determined whether a message sent in response to the home page is a rating message from the first user. If not, then control passes to step 260, described below. However, if it is determined in step 250 that the response to the home page is a rating message from the first user, then control passes to step 252.

In step 252, the profile of the advisor, e.g., the second user, is updated to reflect the rating of the advisee, e.g., the first user. For example, a score in the advisor ratings portion 440 of the advisor's profile data structure is updated with the rating received. Any method may be used to update the rating. For example, a running average of rating scores is kept by keeping the average score and the number of ratings. In some embodiments, one of the highest scores and one of the lowest score is removed, so the highest score and lowest score received so far is also kept in advisor rating portion 440 of the user profile data structure. In some embodiments, separate scores are kept for each style type or target style or both. In some embodiments, separate scores are kept for each image and included in a field (not shown) added to the image index record 431. Control then passes to step 212 to wait for the next request from a client.

In some embodiments, the rating message includes text to be sent to the advisor from the advisee. This occurs, for example, when the advisor invites contact and the advisee provides comments on the advice. When this occurs, step 252 includes forwarding the comments to the advisor, e.g., the second user. The advisor ID is added to the correspondents fields 460 of the advise user profile; and the advisee ID is added to the correspondents fields 460 of the advisor profile data. In some embodiments, the rating message includes accepting an invitation to become partners. When this occurs, step 252 includes adding the advisor ID to the partners fields 460 of the advise user profile; and adding the advisee ID to the partners fields 460 of the advisor profile data.

In some embodiments, the user profile for the advisor is updated to include the comments, for example using another field (not shown) or using the advice field 435 associated with the image for which the advisor provided advice. In a preferred embodiment, an email is sent to the advisor with the advisee comments; and the profile is not updated.

Figure 6A:
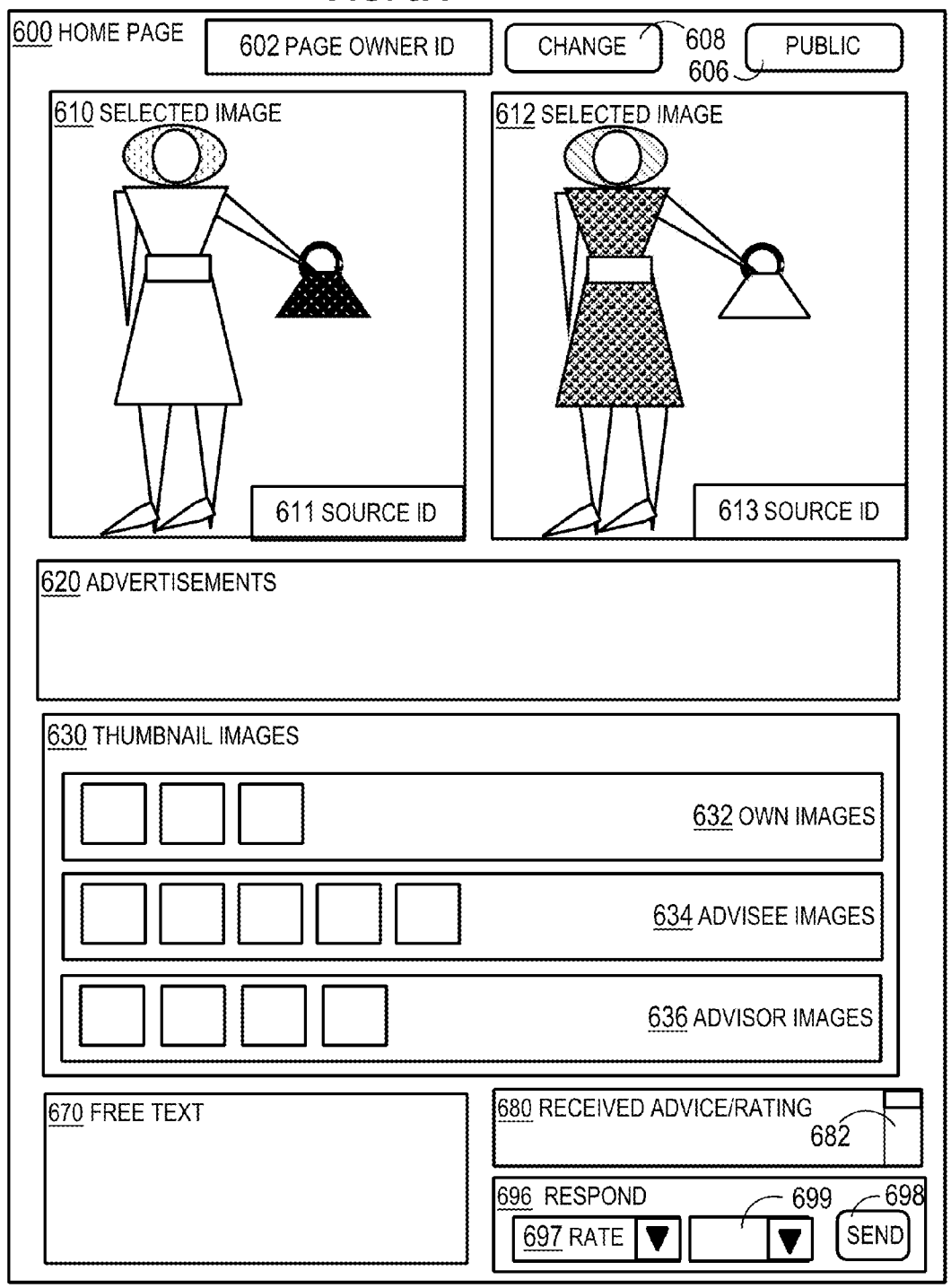
FIG. 6A is a block diagram that illustrates a user home page sent by a style server, according to an embodiment.

FIG. 6A is a block diagram that illustrates a user home page 600 sent by a style server, according to an embodiment. The Home Page 600 includes a page owner ID field 602, a public page button 606, a change button 608, two selected image portions 610 and 612, an advertisements portion 620, a thumbnail images portion 630, a free text input filed 670, a received advice/rating portion 680, and a respond portion 696.

The page owner ID field 602 displays the user ID of the user to whom the home page belongs. The public page button 606 is activated to bring up the shared public page 700, described in more detail below with reference to FIG. 7. The change button 608 is activated to bring up the style registration page 300, described above with reference to FIG. 3.

The selected image portions 610 and 612 display images from the image index of the user profile for the page owner identified in the page owner ID field 602. The images are selected for display in portions 610 and 612 by activating an active page component associated with thumbnails included in the thumbnail images portion 630, as described in more detail below. In the illustrated embodiment, the selected image portions 610 and 612 include a source ID field 611 and 613, respectively. The source ID fields 611 and 613 display the user ID of the user who produced the image. In some embodiments, the adviser or advisee provides the selected image anonymously and the source ID field 611 or 613 is blank.

In the illustrated embodiment, there are two selected image portions 610 and 612, so that a user can easily compare an image with and edited image or colors and patterns of suggested changes associated with the one image; but in other embodiments there are more or fewer image portions.

The advertisements portion 620 displays one or more relevant advertisements based on the user profile, including advice or vendors or topic associated with the user or any image displayed in either or both of the selected image portions 610 or 612. In some embodiments a subset of relevant advertisements are shown in portion 620. In some embodiments, all relevant advertisements are displayed in turn in the advertisement portion 620, changing with time and showing one or more at any one time.

The thumbnail images portion 630 includes thumbnails of images listed in the image index fields 430 of the page owner. Each thumbnail is associated with an active page component, such as by overlaying that component, so that when a user activates the component the image is displayed in one of the selected image portions. In some embodiments, the active component is a pull down menu that displays several options for the image indicated by the thumbnail, such as display, close display, add to public page, or delete, as described in more detail below with reference to FIG. 6B.

In some embodiments, the first image selected is displayed automatically in the first selected image portion 610; and the second selected image portion 612 displays automatically one or more associated images (as indicated in the associated image field 436 of the image record in the user profiled data structure for the user). In some embodiments more than one associated images are displayed in the second selected image portion 612 by tiling the associated thumbnails. In some embodiments, multiple associated images are displayed in the second selected image portion 612 in turn, either automatically after a preset time period, or in response to the user activating an active page component in the image portion 612.

In some embodiments, the user overrides the automatic display of selected thumbnails by indicating a destination for the thumbnail, such as by "dragging and dropping" the thumbnail in the selected image portion with the cursor. Performing a function in response to dragging and dropping an icon on a display with a cursor is well-known in the art.

The thumbnails may be presented in any order. In the illustrated embodiment, the thumbnails are first divided among three areas of the thumbnail images portion 630: an own images area 632; an advisee images area 634; and an advisor images area 636. The own images area 632 includes thumbnails of images for which the page owner is the source, as indicated by the image type field 434 in the user profile data structure. The advisee images area 634 includes thumbnails of images for which the source is an advisee of the page owner, as indicated by the image type field 434 in the user profile data structure. The advisor images area 636 includes thumbnails of images for which the source is an advisor of the page owner, as indicated by the image type field 434 in the user profile data structure.

In some embodiments, the thumbnails within an area are further sorted, e.g., by date or style type or target style or source user ID.

The received advice/rating portion 680 displays data that indicates the advice received with respect to one of the images in the selected image portions 610 and 612. Because it is anticipated that the advice received may be lengthier than can be displayed in any given area of page 600, a scroll bar 682 is depicted that can be activated by the user to scroll through all the advice associated with a selected image. The operation and execution of a scroll bar is well known in the art. In some embodiments, the role and average rating score of the advisor for the style type or target style or both of the associated image is also presented in the received advice/rating portion 680. This is done so that the user can attribute the appropriate weight to the advice received.

In some embodiments, the advice presented is automatically the advice, if any, associated with the image displayed in the first selected image portion 610 by the advisor who provided the image displayed in the second selected image portion 612.

If the page owner is the advisor for the first selected image and not the advisee, then the received advice/ratings portion 680 displays the advisor's average ratings for one or more style types or target styles or both. In some embodiments, which maintain individual ratings for an advisor rather than just an average rating, the received advice/ratings portion also displays the rating given by the advisee for the image in the first image portion 610.

The free text input field 670 allows the user to comment on the advice for sending to the advisor, if the advisor invites contact. If the advisor does not invite contact, the free text input field 670 is deactivated. If the text entered exceeds the area of the free text field, a scroll bar appears to allow the user to continue to enter free text.

The respond portion 696 includes a rate pull-down menu 697 and a Send button 698. The rate pull-down menu 697 is used to select an anonymous rating for the advisor based on the user's assessment of the advice received. Any rating system may be used. For example, in some embodiments, the pull-down menu 697 allows the user to select among the ratings listed in Table. 2 to assign the advisor the corresponding score.

TABLE 2

Example ratings for advice from an advisor.

| Score | "Rate" Pull down menu options |
|---|---|
| 5 | Helpful and creative |
| 2 | Helpful |
| 0 | Not helpful |
| −5 | Distasteful |

The Send 698 is used to send the rating and comments of the user in free text field 670, if any, to the advisor who produced the advice displayed in the received advice portion 680. If no rating is selected, then the Send button is deactivated. When the user activates an active Send button, the text in the free text input field 670, if any, and the rating is sent to the server, which forwards the rating and text, if any, to the advisor as described above for step 252.

In some embodiments the respond portion 696 includes a pull down menu 699 to accept an advisor invitation to become a style partner or invite the advisor to become a partner. Partners are able to view each other's full public page.

In FIG. 6A, the image in portion 612 appears to be an edited image of the image in portion 610. In other examples, the image in portion 612 is an image that displays only one or more colors, textures, patterns or replacement items suggested by an advisor, and the relation of one to the other is indicated by data displayed in the received advice portion 680. In some embodiments, as described below with reference to FIG. 6B, the second image depicts one or more changes and associates the change element by highlighting one or more pixels in the image of the first selected image portion 610.

Figure 6B:
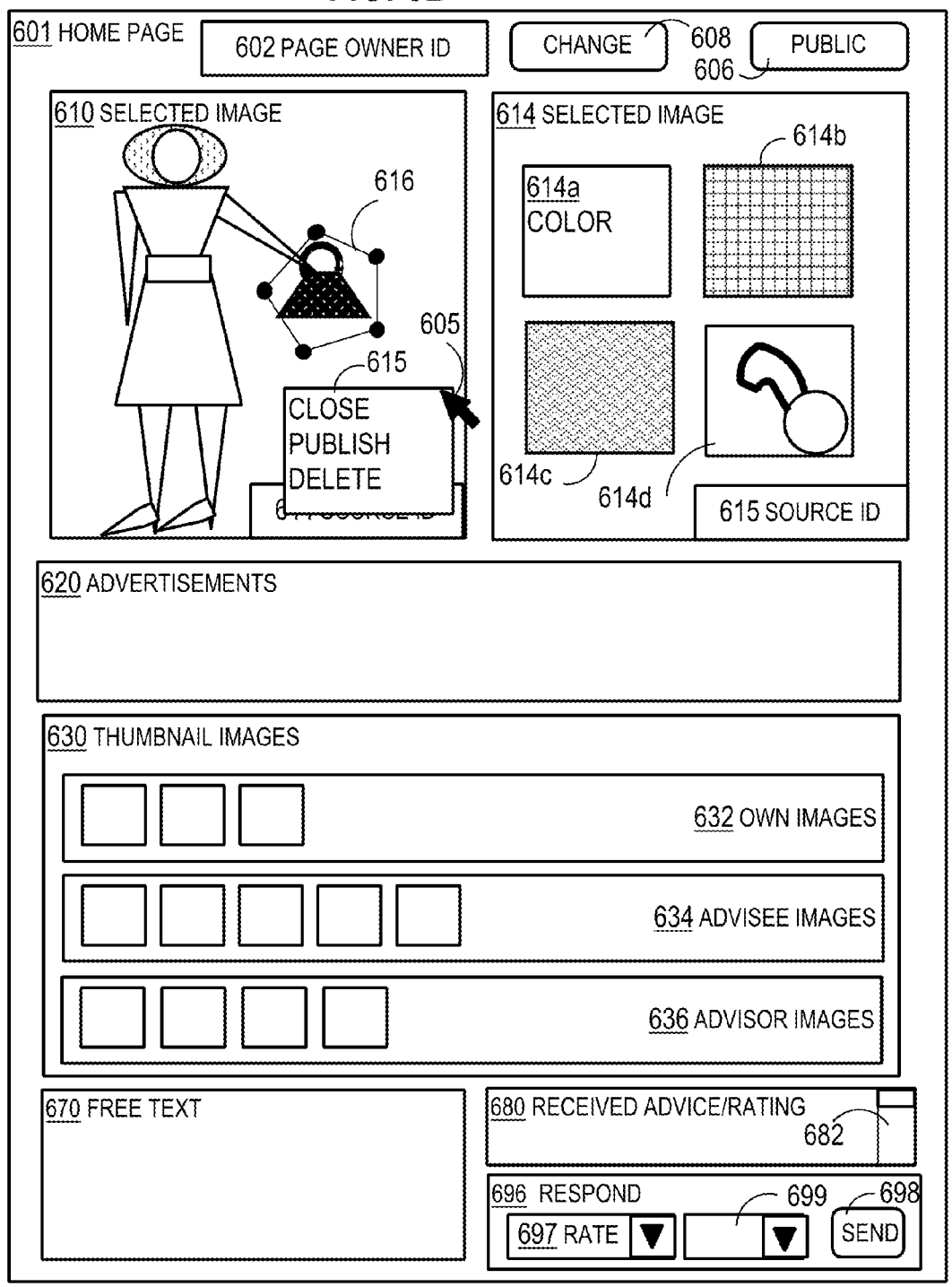
FIG. 6B is a block diagram that illustrates a different user home page sent by a style server, according to an embodiment.

FIG. 6B is a block diagram that illustrates a different user home page 601 sent by a style server, according to an embodiment. In this embodiment, the second selected image 614 with source ID field 615 displays only the changes suggested by the advisor, without editing the original image. The other portions of home page 601 are as described above for home page 600 in FIG. 6A. In the illustrated embodiment, the second selected image 614 includes a color portion 614a, a pattern portion 614b, a texture portion 614c and a replacement item portion 614d. In the illustrated embodiment, the color, pattern, texture and replacement item portions are associated with elements of the first selected image 610 by means of a label included in the received advice portion 680, e.g., the label "purse." In some embodiments, the suggested change or changes are associated with an element in the first selected image by highlighting one or more pixels that indicate the element, such as by showing polygon 616 of pixel locations on the original image that surround the change element.

In some embodiments, each selected image or thumbnail is associated with an active area that detects when a cursor 605 controlled by a pointing device is over area and displays a menu when a button on the pointing device is depressed (e.g., a right button is clicked). An example menu 615 is depicted in FIG. 6B when the cursor is placed and clicked over the selected image 610. The menu 615 give the user the option to close the selected image, publish the selected image to the user's public page, or delete the selected image, and its thumbnail, from the user's home page 601.

Referring again to FIG. 2B, if it is determined in step 250 that the request is not a rating message from the first user, then control passes to step 260. In step 260, it is determined whether the request is to view a public page. If not, control passes to step 210 to determine what type of request is received from the client. If so, control passes to step 262 to send the public page to the client.

For example, a user requests the user's own public page by activating the public button 606 on the user's home page, described above. The user requests a different user's public page by activating a partner's ID in a partner's portion of the user's public page, as described next with respect to FIG. 7.

Figure 7:
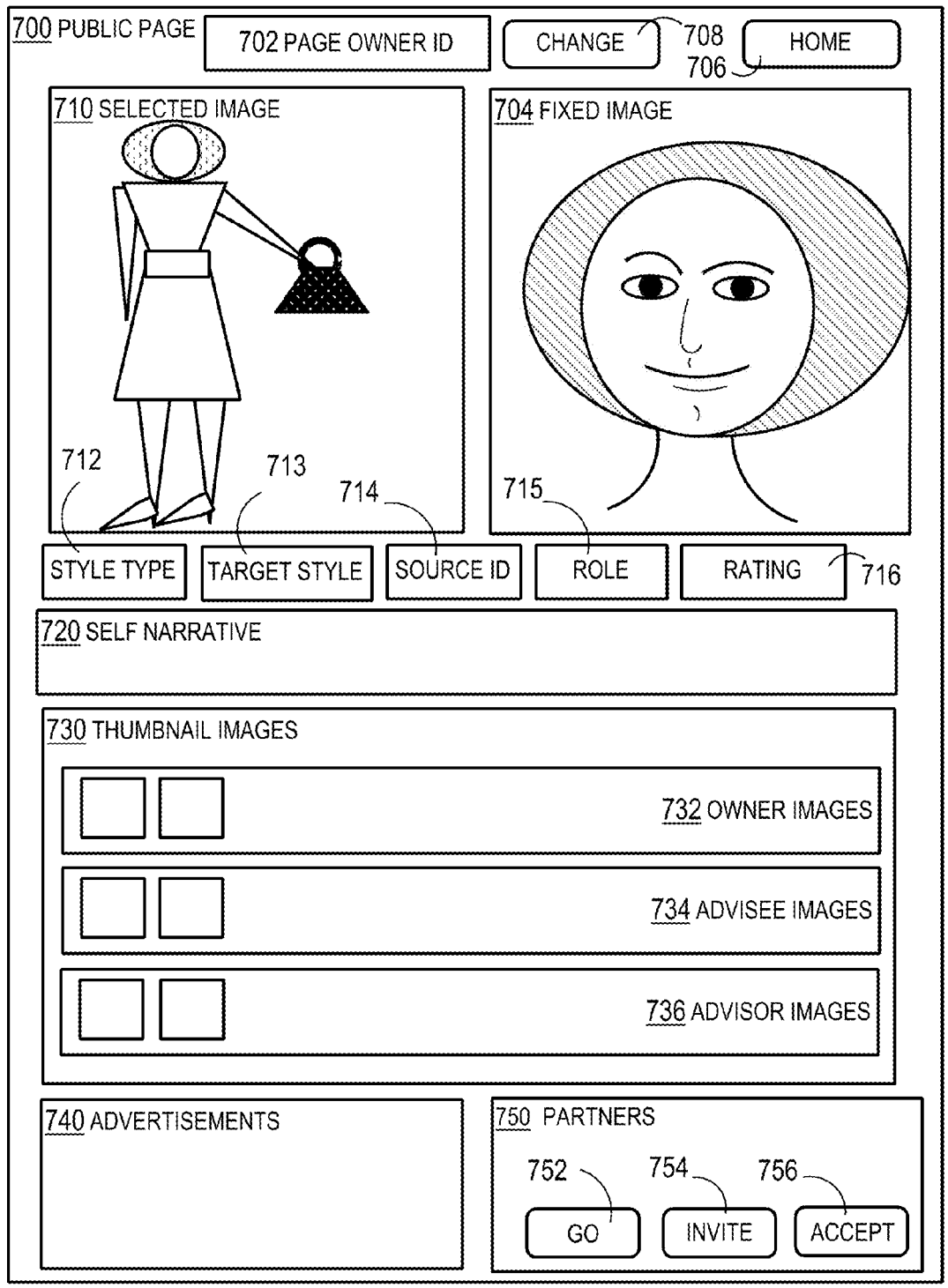
FIG. 7 is a block diagram that illustrates a public page sent by a style server, according to an embodiment.
Figure 8:
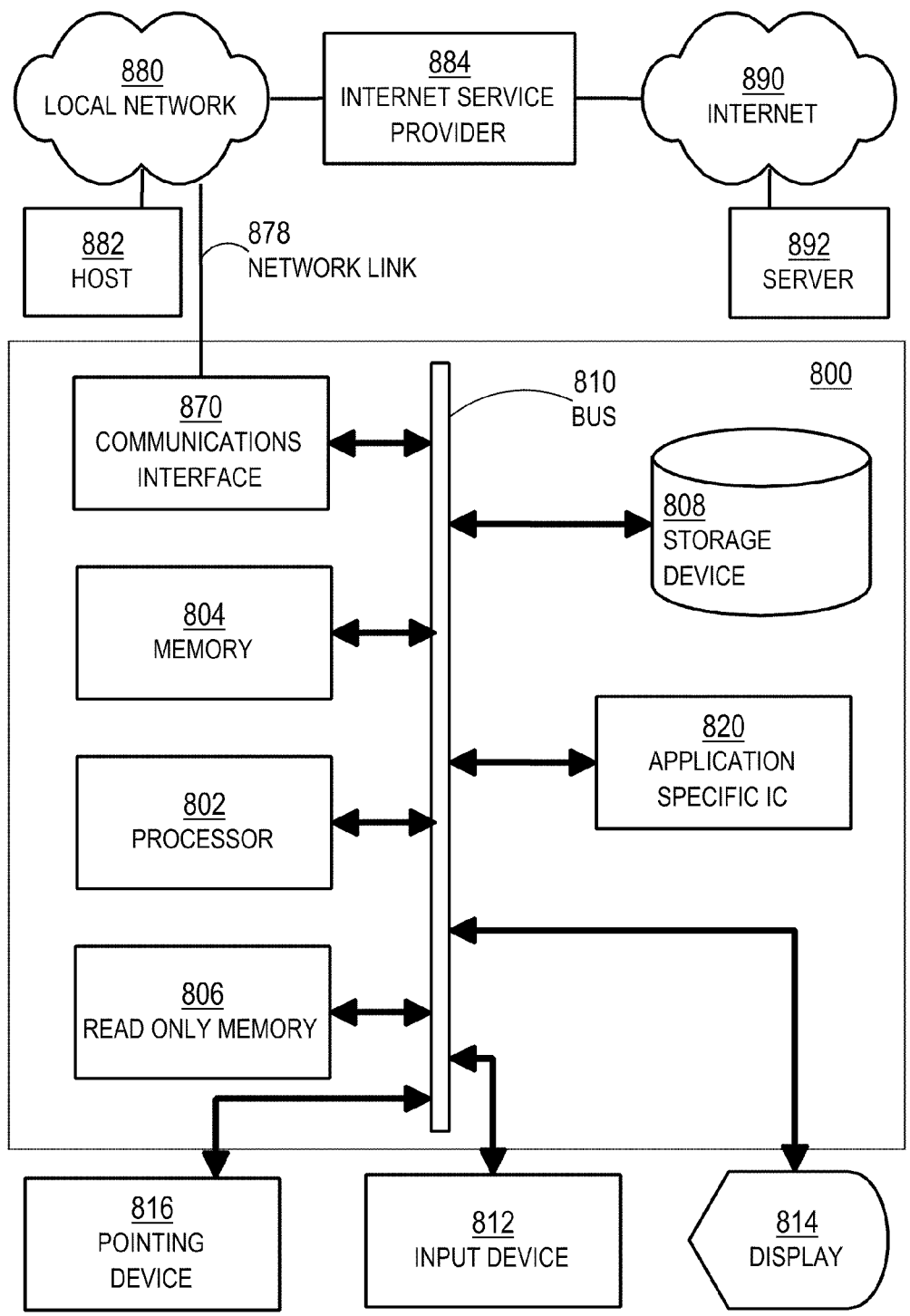
FIG. 8 is a block diagram that illustrates a computer system upon which an embodiment of the invention may be implemented.

FIG. 7 is a block diagram that illustrates a public page 700 sent by a style server, according to an embodiment. The Public Page 700 includes a page owner ID field 702, a home page button 706, a change button 708, a selected image portion 710, a fixed image portion 704, a self narrative portion 720, a thumbnail images portion 730, an advertisements portion 740 and a partners portion 750.

The page owner ID field 702 displays the user ID of the user to whom the home page belongs. The home page button 706 is activated to bring up the user's home page 600 (or 601), described above. The change button 708 is activated to bring up the style registration page 300, described above with reference to FIG. 3.

The fixed image portion 704 displays an image provided by the page owner to identify the owner. It can be a photograph of the owner, a logo for the owner, or any image the owner considers suitable for an online identity, e.g., a drawing or a photo of a pet.

The self narrative portion 720 includes text that describes whatever the owner wishes to say about the owner's use of the style server, such as why the owner has registered as a user, what are the short or long term goals of the owner for the service, the owner's gender, culture or geographic area or anything that might be of interest to other users or entice other users to become the owner's partner.

The advertisements portion 740 includes images or references to vendors which are associated with one or more the images on the public page 700.

In some embodiments, the fixed image 704 and self narrative 720 and advertisements 740, but no other portions, are displayed to users who have not become style partners for the owner of the public page 700.

The selected image portion 710 displays a published image from the image index of the user profile for the page owner identified in the page owner ID field 702. The images are selected for display in portions 710 by activating an active page component associated with thumbnails included in the thumbnail images portion 730. The thumbnail images portion 730 includes thumbnails of published images listed in the image index fields 430 of the page owner. Each thumbnail is associated with an active page component, such as by overlaying that component, so that when a user activates the component the image is displayed in the selected image portion 710. In some embodiments, the active component is a menu that displays several options for the image indicated by the thumbnail, such as display, close display, add to public page. If the user is the page owner, then the menu includes the option to delete the image from the public page. The thumbnails may be presented in any order. In the illustrated embodiment, the thumbnails are first divided among three areas of the thumbnail images portion 730: an own images area 732; an advisee images area 734; and an advisor images area 736, depending on the role the page owner played for that image.

In the illustrated embodiment, the selected image portion 710 includes a style type field 712, a target style field 713, a source ID field 714, a role field 715 and a rating field 714. The style type field 712 holds data that indicates the style type associated with the selected image 710. The target style field 713 holds data that indicates the target style associated with the selected image 710. The source ID field 714 holds data that indicates the user who produced the selected image 710 (unless the user has indicated this information is not to be displayed with this image). The role field 715 holds data that indicates the role the user who provided the image was playing for the image, e.g., as expert, intermediate, novice or help role. If the role is expert or intermediate, then the image indicates that user's best attempt at the target style indicated in field 713.

The rating field 716 holds data that indicates the rating the user received from other users who viewed the image. In some embodiments, the rating is the average rating of the user who is the source of the image. In some embodiments, the rating is the rating for that particular image. In some embodiments, the rating field includes an active area that allows the user who is viewing the selected image 710 (the viewer) to input the viewer's rating and have that averaged into the rating for the source of the image. In some embodiments, only the public page owner may add a rating to the value displayed in the field 716.

The partners portion 750 is used to list the partners of the owner of the public page, or users who are invited by the owner to become partners or users who have invited the owner to become a partner. The partners portion 750 can include any fields and active components known in the art for establishing a connection on a social network. In the illustrated embodiment, the partners area includes a go button 752, an invite button 754, and an accept button 756. The go button 752 is used to go the public page of the partner highlighted in the partners portion 750. The invite button 754 is used to invite the page owner's partner highlighted in the partners portion 750 to become a partner of the viewer. The accept button 756 is used by the page owner to accept an invitation to become a partner from a user who is not yet a partner of the page owner. This button is deactivated for a viewer who is not the page owner.

A visitor to the public page who is not a partner can use the invite button to ask the owner to become the viewer's partner. The viewer can make the invite decision based on the fixed image, self narrative or advertisements displayed to users who are not partners.

Referring again to FIG. 2B, after the public page is sent in step 262, control passes to step 264. In step 264 it is determined whether there is an edit message from the owner of the public page. If not, control passes back to step 212 to wait for the next request from a client. For example, if the viewer is not the public page owner, then control passes back to step 212.

If it is determined in step 264, that there is an edit message from the public page owner, control passes to step 266. For example, if the owner deletes an image or accepts an invitation to become a partner, control passes to step 266. In step 266, the public page is edited based on the edit message received from the public page owner. For example, the image is deleted or the inviter is added to the partners listed in the partners portion 750. Control then passes to step 212 to await the next request from a client.

Using the method 200, users with a Web browser can register to receive or give advice on personal style, anonymously or with attribution, for any of one or more style types and target styles based on an example of style depicted in an image provided by a user. Furthermore, vendors can be encouraged that their advertisements are being received by interested and motivated users much more likely than average to make a purchase. Users are able to make connections with other users having common interests or tastes in style.

3. Hardware Overview

FIG. 7 is a block diagram that illustrates a computer system 700 upon which an embodiment of the invention may be implemented. Computer system 700 includes a communication mechanism such as a bus 710 for passing information between other internal and external components of the computer system 700. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 710 includes many parallel conductors of information so that information is transferred quickly among devices coupled to the bus 710. One or more processors 702 for processing information are coupled with the bus 710. A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication. A sequence of operations to be executed by the processor 702 constitute computer instructions.

Computer system 700 also includes a memory 704 coupled to bus 710. The memory 704, such as a random access memory (RAM) or other dynamic storage device, stores information including computer instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of computer instructions. The computer system 700 also includes a read only memory (ROM) 706 or other static storage device coupled to the bus 710 for storing static information, including instructions, that is not changed by the computer system 700. Also coupled to bus 710 is a non-volatile (persistent) storage device 708, such as a magnetic disk or optical disk, for storing information, including instructions, that persists even when the computer system 700 is turned off or otherwise loses power.

Information, including instructions, is provided to the bus 710 for use by the processor from an external input device 712, such as a keyboard containing alphanumeric keys operated by a human user, or a sensor. A sensor detects conditions in its vicinity and transforms those detections into signals compatible with the signals used to represent information in computer system 700. Other external devices coupled to bus 710, used primarily for interacting with humans, include a display device 714, such as a cathode ray tube (CRT) or a liquid crystal display (LCD), for presenting images, and a pointing device 716, such as a mouse or a trackball or cursor direction keys, for controlling a position of a small cursor image presented on the display 714 and issuing commands associated with graphical elements presented on the display 714.

In the illustrated embodiment, special purpose hardware, such as an application specific integrated circuit (IC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 770 sends and receives electrical, acoustic or electromagnetic signals, including infrared and optical signals, that carry information streams, such as digital data.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and waves that travel through space without wires or cables, such as acoustic waves and electromagnetic waves, including radio, optical and infrared waves.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Network link 778 typically provides information communication through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server 792 connected to the Internet provides a service in response to information received over the Internet. For example, server 792 provides information representing video data for presentation at display 714.

The invention is related to the use of computer system 700 for implementing the techniques described herein. According to one embodiment of the invention, those techniques are performed by computer system 700 in response to processor 702 executing one or more sequences of one or more instructions contained in memory 704. Such instructions, also called software and program code, may be read into memory 704 from another computer-readable medium such as storage device 708. Execution of the sequences of instructions contained in memory 704 causes processor 702 to perform the method steps described herein. In alternative embodiments, hardware, such as application specific integrated circuit 720, may be used in place of or in combination with software to implement the invention. Thus, embodiments of the invention are not limited to any specific combination of hardware and software.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server 792 transmits program code for a particular application, requested by a message sent from computer 700, through Internet 790, ISP equipment 784, local network 780 and communications interface 770. The received code may be executed by processor 702 as it is received, or may be stored in storage device 708 or other non-volatile storage for later execution, or both. In this manner, computer system 700 may obtain application program code in the form of a signal on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red a carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

4. Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for providing advice on personal style, comprising:

determining on a processor advice field data that indicates a plurality of fields to be filled by an advisor to provide information on how to improve personal style of an advisee based on an image provided by the advisee including a vendor field to hold data that indicates a vendor from which the advisee may obtain a suggested change, wherein the advice field data further indicates for each field a plurality of predetermined values from which an advisor can select including a plurality of vendors for the vendor field so that the field is not a free text field;

causing a prompt message to be presented on a remote processor to a first user;

in response to causing the prompt message to be presented, receiving a demonstration message that includes first image data that indicates example personal style of a first user;

determining on a processor a different second user based on the demonstration message;

determining on a processor second image data based on the first image data;

sending the second user an advice prompt message comprising determining on a processor an advice prompt message based on the advice field data and the second image data;

in response to sending the advice prompt message, receiving from the second user change vendor data indicating a particular vendor from the plurality of vendors;

determining a plurality of selections available from the particular vendor; and, sending to the second user vendor selection data that indicates the plurality of selections available from the particular vendor.

2. The method as recited in claim 1, further comprising receiving from the second user an opinion message that includes a value for at least one field indicated by the advice field data and at least one selection from the plurality of selections available from the particular vendor.

3. The method as recited in claim 2, further comprising sending to the first user a report message that includes a value for at least one field indicated by the advice field data and at least one selection from the plurality of selections available from the particular vendor based on the opinion message.

4. The method as recited in claim 3, wherein the report message includes third image data based on the second image data and a value based on the opinion message for the at least one field indicated by the advice field data.

5. The method as recited in claim 3, further comprising prompting the first user to rate the report message.

6. The method as recited in claim 5, further comprising receiving a rating response message from the first user and modifying a user profile for the second user based on the rating response message.

7. The method as recited in claim 2, further comprising the step of sending to the first user an advertisement message that indicates a product from the particular vendor, wherein the product indicated is based on the opinion message.

8. The method as recited in claim 7, further comprising:

sending, to the vendor, advertisement count data that indicates vendor product information was sent to an interested user; and receiving payment from the vendor based on the advertisement count data.

9. The method as recited in claim 1, wherein the advice field data indicates at least one of a change element field that indicates an element depicted in the first image, a color change field that indicates a color change for the element indicated in the change element field, a texture change field that indicates a texture change for the element indicated in the change element field, a pattern change field that indicates a new pattern for the element indicated in the change element field, or a replacement element field that indicates a different element to replace the element indicated in the change element field.

10. The method as recited in claim 1, further comprising sending to the first user an advertisement message that indicates a product from the particular vendor, wherein the product indicated is based on the demonstration message.

11. The method as recited in claim 10, further comprising:
    sending, to the vendor, advertisement count data that indicates vendor product information was sent to an interested user; and
    receiving payment from the vendor based on the advertisement count data.

12. The method as recited in claim 1, further comprising prompting the first user for data to include in the demonstration message.

13. The method as recited in claim 1, further comprising prompting a user for registration data that indicates one or more types of styles and a single role associated with each type of style, wherein the single role is one of a plurality of roles, wherein the plurality of roles includes a novice role and an expert role.

14. The method as recited in claim 13, wherein the one or more types of style includes at least one of a room style, a clothes style, a hair style, a makeup style or a fitness style.

15. A non-volatile computer-readable medium carrying one or more sequences of instructions for providing advice on personal style, wherein execution of the one or more sequences of instructions by one or more processors causes the one or more processors to perform the steps of:
    receiving advice field data that indicates a plurality of fields to be filled by an advisor to provide information on how to improve personal style of an advisee based on an image provided by the advisee including a vendor field to hold data that indicates a vendor from which the advisee may obtain a suggested change, wherein the advice field data further indicates for each field a plurality of predetermined values from which an advisor can select including a plurality of vendors for the vendor field so that the field is not a free text field;
    receiving a demonstration message that includes first image data that indicates example personal style of a first user;
    sending to a different second user an advice prompt message that includes second image data based on the first image data, and the advice field data;
    in response to sending the advice prompt message, receiving from the second user change vendor data indicating a particular vendor from the plurality of vendors;
    determining a plurality of selections available from the particular vendor; and,
    sending to the second user vendor selection data that indicates the plurality of selections available from the particular vendor.

16. An apparatus comprising:
    a network interface for communicating data packets with a network;
    a processor; and
    a computer-readable medium carrying one or more sequences of instructions, wherein execution of the one or more sequences of instructions by the processor causes the processor to:
    receive advice field data that indicates a plurality of fields to be filled by an advisor to provide information on how to improve personal style of an advisee based on an image provided by the advisee including a vendor field to hold data that indicates a vendor from which the advisee may obtain a suggested change, wherein the advice field data further indicates for each field a plurality of predetermined values from which an advisor can select including a plurality of vendors for the vendor field so that the field is not a free text field;
    receive through the network interface a demonstration message that includes first image data that indicates example personal style of a first user;
    sending through the network interface to a different second user an advice prompt message that includes second image data based on the first image data, and the advice field data;
    in response to sending the advice prompt message, receiving from the second user change vendor data indicating a particular vendor from the plurality of vendors;
    determining a plurality of selections available from the particular vendor; and,
    sending to the second user vendor selection data that indicates the plurality of selections available from the particular vendor.

17. A system comprising:
    one or more network interfaces for communicating data packets with a network; one or more processors; and
    one or more computer-readable media carrying one or more sequences of instructions, wherein execution of the one or more sequences of instructions by the one or more processors causes the one or more processors to:
    receive advice field data that indicates a plurality of fields to be filled by an advisor to provide information on how to improve personal style of an advisee based on an image provided by the advisee including a vendor field to hold data that indicates a vendor from which the advisee may obtain a suggested change, wherein the advice field data further indicates for each field a plurality of predetermined values from which an advisor can select including a plurality of vendors for the vendor field so that the field is not a free text field;
    receive through the network interface a demonstration message that includes first image data that indicates example personal style of a first user;
    sending through the network interface to a different second user an advice prompt message that includes second image data based on the first image data, and the advice field data;
    in response to sending the advice prompt message, receiving from the second user change vendor data indicating a particular vendor from the plurality of vendors;
    determining a plurality of selections available from the particular vendor; and, sending to the second user vendor selection data that indicates the plurality of selections available from the particular vendor.

* * * * *